United States Patent
Su et al.

(10) Patent No.: US 9,648,351 B2
(45) Date of Patent: May 9, 2017

(54) ERROR CONTROL IN MULTI-STREAM EDR VIDEO CODEC

(71) Applicant: Dolby Laboratories Licensing Corporation, San Francisco, CA (US)

(72) Inventors: Guan-Ming Su, Fremont, CA (US); Xi Xu, Chicago, IL (US); Sheng Qu, San Jose, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 346 days.

(21) Appl. No.: 14/514,597

(22) Filed: Oct. 15, 2014

(65) Prior Publication Data
US 2015/0117551 A1 Apr. 30, 2015

Related U.S. Application Data

(60) Provisional application No. 61/895,340, filed on Oct. 24, 2013.

(51) Int. Cl.
*H04N 19/65* (2014.01)
*H04N 19/895* (2014.01)
(Continued)

(52) U.S. Cl.
CPC .......... *H04N 19/65* (2014.11); *H04N 19/196* (2014.11); *H04N 19/23* (2014.11); *H04N 19/34* (2014.11);
(Continued)

(58) Field of Classification Search
CPC ...... H04N 19/196; H04N 19/23; H04N 19/34; H04N 19/463; H04N 19/503;
(Continued)

(56) References Cited

U.S. PATENT DOCUMENTS 8,774,538 B2 * 7/2014 Nassor ................... H04N 7/327
375/240.25
2006/0088107 A1 * 4/2006 Cancemi .......... H04N 21/23608
375/240.27
(Continued)

FOREIGN PATENT DOCUMENTS

EP 1775954 4/2007
FR EP 1775954 A1 * 4/2007 ........... H04N 19/139
(Continued)

OTHER PUBLICATIONS

Ma, M. et al "Error Concealment for Frame Losses in MDC" IEEE Transactions on Multimedia, vol. 10, No. 8, Dec. 2008, pp. 1638-1647.
(Continued)

*Primary Examiner* — Christopher S Kelley
*Assistant Examiner* — Kathleen Walsh

(57) ABSTRACT

Error control in multi-stream visual dynamic range (VDR) codecs is described, including for a case of a layer-decomposed (non-backward compatible) video codecs. Error control can be provided by concealing lost and/or corrupted data in data frames of a decoded VDR bitstream prior to rendering a corresponding VDR image. Various algorithms and methods for concealing lost and/or corrupted data are provided.

16 Claims, 9 Drawing Sheets

(51) Int. Cl.
　　　*H04N 19/503*　　(2014.01)
　　　*H04N 19/196*　　(2014.01)
　　　*H04N 19/463*　　(2014.01)
　　　*H04N 19/23*　　(2014.01)
　　　*H04N 19/34*　　(2014.01)
　　　*H04N 19/44*　　(2014.01)
　　　*H04N 19/67*　　(2014.01)
　　　*H04N 19/89*　　(2014.01)

(52) U.S. Cl.
　　　CPC ........... *H04N 19/44* (2014.11); *H04N 19/463* (2014.11); *H04N 19/503* (2014.11); *H04N 19/895* (2014.11)

(58) Field of Classification Search
　　　CPC ...... H04N 19/895; H04N 19/44; H04N 19/65; H04N 19/67; H04N 19/89
　　　USPC .................................................... 375/240.27
　　　See application file for complete search history.

(56) References Cited

U.S. PATENT DOCUMENTS

| | | | |
|---|---|---|---|
| 2006/0282737 A1* | 12/2006 | Shi .................... | H03M 13/2966 714/746 |
| 2007/0009039 A1* | 1/2007 | Ryu .................... | H04N 19/139 375/240.16 |
| 2007/0033494 A1* | 2/2007 | Wenger ................ | H04N 19/147 714/776 |
| 2009/0138773 A1* | 5/2009 | Henocq ................ | H04N 19/30 714/746 |
| 2010/0150232 A1* | 6/2010 | Nguyen ............. | H04N 21/2389 375/240.12 |
| 2010/0183071 A1* | 7/2010 | Segall ....................... | G06T 5/50 375/240.16 |
| 2011/0122945 A1* | 5/2011 | Li .................... | H04N 19/00321 375/240.12 |
| 2012/0033040 A1* | 2/2012 | Pahalawatta ......... | H04N 19/597 348/43 |
| 2013/0148029 A1 | 6/2013 | Gish | |
| 2013/0230108 A1* | 9/2013 | Leannec ................ | H04N 19/70 375/240.16 |
| 2013/0279606 A1* | 10/2013 | Vanam ............. | H04N 19/00854 375/240.27 |
| 2013/0329778 A1 | 12/2013 | Su | |
| 2014/0036999 A1* | 2/2014 | Ryu ....................... | H04N 19/50 375/240.12 |
| 2014/0050271 A1 | 2/2014 | Su | |
| 2014/0161198 A1* | 6/2014 | Tan ...................... | H04N 19/895 375/240.27 |
| 2014/0247869 A1 | 9/2014 | Su | |
| 2016/0249069 A1* | 8/2016 | Ryu ....................... | H04N 19/895 |

FOREIGN PATENT DOCUMENTS

WO　　2013/086169　　6/2013
WO　　2013/103522　　7/2013

OTHER PUBLICATIONS

Huang, C. et al. "Error Concealment for Shape in MPEG-4 Object-Based Video Coding" IEEE Transactions on Image Processing, vol. 14, No. 4, Apr. 2005, pp. 389-396.

\* cited by examiner

ERROR CONTROL IN MULTI-STREAM EDR VIDEO CODEC

CROSS REFERENCE TO RELATED APPLICATIONS

This application claims the benefit of priority to U.S. Provisional Application Ser. No. 61/895,340, filed on Oct. 24, 2013, which is incorporated herein by reference in its entirety. The present disclosure may be related to U.S. patent application Ser. No. 13/818,288, entitled "Extending Image Dynamic Range," filed on Feb. 21, 2013 and published as US 20130148029, to be referred to from now on as the '288 application, which is incorporated herein by reference in its entirety. The present disclosure may be further related to PCT Application No. PCT/US2012/062932, entitled "Layer Decomposition in Hierarchical VDR Coding", filed on Nov. 1, 2012, to be referred to from now on as the '932 application, which is incorporated herein by reference in its entirety. The present disclosure may be further related to U.S. application Ser. No. 13/908,926, entitled "Joint Base Layer and Enhancement Layer Quantizer Adaptation in EDR Video Coding," filed on Jun. 3, 2013, to be referred to from now on as the '926 application, which is incorporated herein by reference in its entirety. The present disclosure may be further related to PCT Application No. PCT/US2012/070397, entitled "Specifying Visual Dynamic Range Coding Operations and Parameters", filed on Dec. 18, 2012, to be referred to from now on as the '397 application, which is incorporated herein by reference in its entirety.

FIELD

This disclosure relates to image processing and video decoding. More particularly, embodiments of the present disclosure relate to error detection and concealment in enhanced dynamic reproduction/range (EDR) video decoding due to packet loss.

BACKGROUND

Display technologies being developed by Dolby Laboratories, Inc., and others, are able to reproduce images having high dynamic range (HDR). Such displays can reproduce images that more faithfully represent real-world scenes than conventional displays characterized by approximately three orders of magnitude of dynamic range (e.g., standard dynamic range SDR).

Dynamic range (DR) is a range of intensity (e.g., luminance, luma) in an image, e.g., from darkest darks to brightest brights. As used herein, the term 'dynamic range' (DR) may relate to a capability of the human psychovisual system (HVS) to perceive a range of intensity (e.g., luminance, luma) in an image, e.g., from darkest darks to brightest brights. In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 orders of magnitude of the human visual system (HVS). For example, well adapted humans with essentially normal vision (e.g., in one or more of a statistical, biometric or ophthalmological sense) have an intensity range that spans about 15 orders of magnitude. Adapted humans may perceive dim light sources of as few as a mere handful of photons. Yet, these same humans may perceive the near painfully brilliant intensity of the noonday sun in desert, sea or snow (or even glance into the sun, however briefly to prevent damage). This span though is available to 'adapted' humans, e.g., those whose HVS has a time period in which to reset and adjust.

In contrast, the DR over which a human may simultaneously perceive an extensive breadth in intensity range may be somewhat truncated, in relation to HDR. As used herein, the terms 'enhanced dynamic range' (EDR), 'visual dynamic range,' or 'variable dynamic range' (VDR) may individually or interchangeably relate to the DR that is simultaneously perceivable by a HVS. As used herein, EDR may relate to a DR that spans 5-6 orders of magnitude. Thus while perhaps somewhat narrower in relation to true scene referred HDR, EDR nonetheless represents a wide DR breadth. As used herein, the term 'simultaneous dynamic range' may relate to EDR.

To support backwards compatibility with existing 8-bit video codecs, such as those described in the ISO/IEC MPEG-2 and MPEG-4 specifications, as well as new HDR display technologies, multiple layers may be used to deliver HDR video data from an upstream device to downstream devices. In one approach, generating an 8-bit base layer (BL) version from the captured HDR version may involve applying a global tone mapping operator (TMO) to intensity (e.g., luminance, luma) related pixel values in the HDR content with higher bit depth (e.g., 12 or more bits per color component). In another approach, the 8-bit base layer may be created using an adaptive linear or non-linear quantizer. Given a BL stream, a decoder may apply an inverse TMO or a base layer-to-EDR predictor to derive an approximated EDR stream. To enhance the quality of this approximated EDR stream, one or more enhancement layers (EL) may carry residuals representing the difference between the original HDR content and its EDR approximation, as it will be recreated by a decoder using only the base layer.

Some decoders, for example those referred to as legacy decoders, may use the base layer to reconstruct an SDR version of the content to be displayed on standard resolution displays. Advanced decoders may use both the base layer and the enhancement layers to reconstruct an EDR version of the content to render it on more capable displays. Improved techniques for layered-coding of EDR video are used for efficient video coding and superior viewing experience. Such techniques use advanced encoders which encode image information in a non-backward compatible format, which is incompatible with legacy decoders. More information on advanced encoders and associated decoders (e.g. codecs) can be found, for example, in the '932 application and the '926 application, which describe backward and non-backward compatible codecs developed by Dolby. Such advanced codecs which encode the image information in a non-backward compatible format can be referred to as "layer decomposed" codecs.

A visual dynamic range (VDR) codec, such as a layer-decomposed codec, can consist of three basic streams in the corresponding VDR combination stream, namely, a base layer (BL) stream, an enhancement layer stream (EL), and a reference picture unit (RPU) stream. Bit errors (e.g. packet loss) can occur during a transmission of the combo stream, such that some bits in some streams, such as for example in a portion of a stream (e.g. a packet), are corrupted. The BL and EL are the compressed video streams encoded using any legacy video codec (such as MPEG-2/AVC/HEVC), thus they exhibit decoding dependency characteristics. In other words, a bit error could cause a decoding failure not only in a current block and frame, but also propagate the decoding error to the following dependent frames. The RPU stream contains the composing metadata which can be used to transform BL and EL decoded pictures to VDR domain and combine the transformed data such as to provide the final VDR signal for viewing on a compatible display. The composing parameters can comprise mapping/prediction parameters for BL, non-linear de-quantizer parameters for EL, and mapping color space parameters. The RPU can be encoded as frame based (e.g. one specific RPU per frame), which avoids the decoding dependency, but bit error in each frame could result in loss of composing parameters (e.g. content) of the RPU and lead to erroneous reconstruction of content frames (e.g. based on EL and BL bitstreams) in the decoder. To provide enjoyable viewing experience, an error control mechanism is needed to conceal the errors caused during the bitstream (e.g. combo stream) transmission. More information regarding to the RPU stream content and a corresponding syntax can be found, for example, in the '397 application.

As compared to codecs used in a traditional single layer video transmission and/or in a traditional SDR/spatial scalable/temporal scalable dual layer video transmission, a layer-decomposed codec, such as described in the '932 application, has some unique features. For example, a highlight part of a scene (e.g. or a corresponding content frame) is encoded in the EL stream and a dark/mid-tone part of the scene (e.g. or a corresponding content frame) is encoded in the BL stream, using, for example, a clipping method as described in the '932 application. At the decoder, BL and EL streams are decoded independently and information pertinent to an original image (e.g. a content frame) co-exists in both layers (e.g. non-redundant information). Such non-redundant information and independent decoding can be used in developing methods and systems to conceal damaged pictures such as when embedded within, for example, an error control module, can result in a more enjoyable viewing experience of the decoded video stream.

BRIEF DESCRIPTION OF THE DRAWINGS

The accompanying drawings, which are incorporated into and constitute a part of this specification, illustrate one or more embodiments of the present disclosure and, together with the description of example embodiments, serve to explain the principles and implementations of the disclosure.

FIG. 5 shows an object segmentation step of the algorithm, FIG. 6 shows an initial pairing up step of the algorithm, and FIG. 7 shows an iteration pairing up step and an error conceal (EC) step of the algorithm.

SUMMARY

Figure 1:
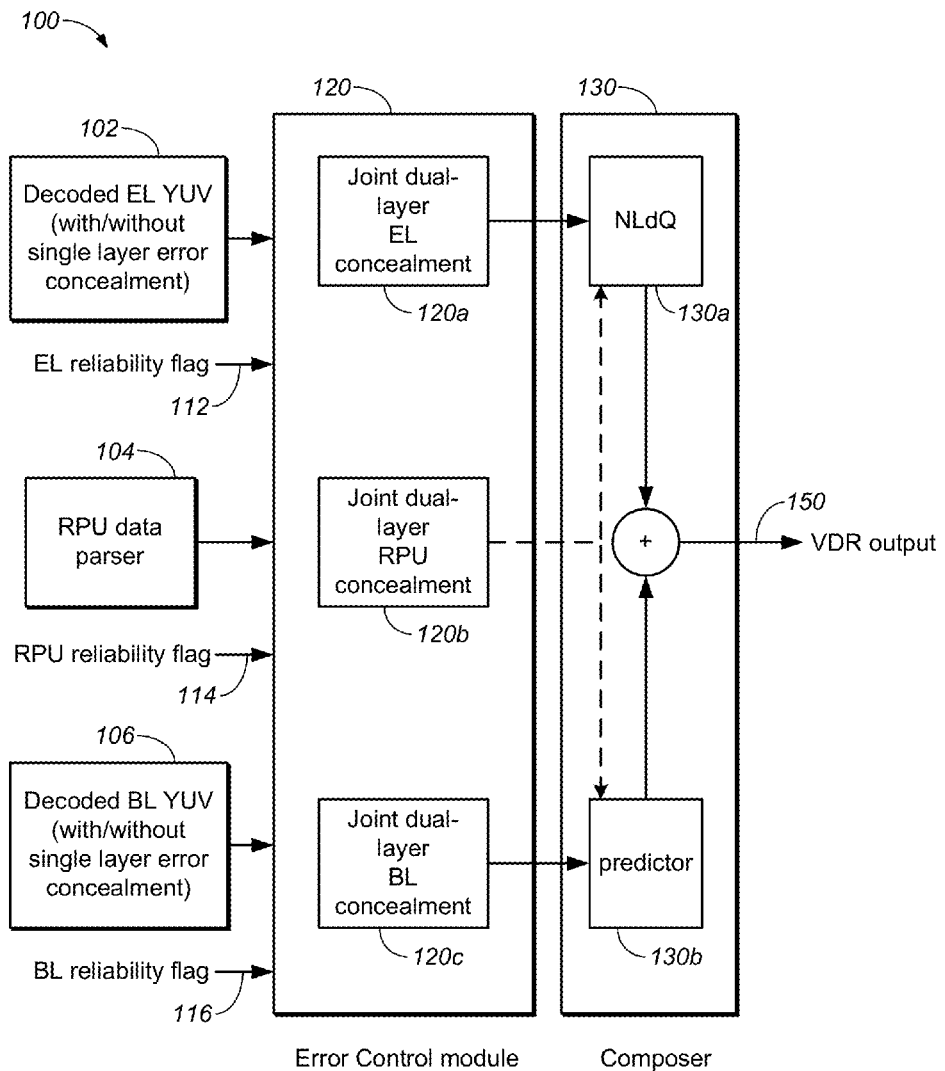
FIG. 1 shows a system configuration of a VDR decoder within which an Error Control Module according to an embodiment of the present disclosure is inserted.

According to a first aspect of the present disclosure, an error control component configured to receive a decoded visual dynamic range (VDR) combination stream is presented, the error control component comprising one or more video content streams and a reference picture unit (RPU) stream, wherein during operation, the error control component replaces erroneous and/or missing data in a current frame of the decoded VDR combination stream with replacement data based on data in one or more frames different from the current frame of the decoded VDR combination stream to conceal effect of the erroneous and/or missing data in a reconstructed VDR image in correspondence of the decoded VDR combination stream.

According to a second aspect of the present disclosure, a method for concealing effects of errors in a decoded visual dynamic range (VDR) combination stream is presented, the method comprising: receiving a decoded VDR combination stream, the decoded VDR combination stream comprising a reference picture unit (RPU) stream in correspondence of a plurality of RPU frames and one or more video content streams in correspondence of a plurality of content frames; receiving a reliability flag in correspondence of an erroneous and/or missing current frame of a stream of the decoded VDR combination stream, the erroneous and/or missing current frame being an RPU frame, or a content frame; based on the receiving, replacing data of the erroneous and/or missing current frame with replacement data based on data in one or more frames of the same stream, the one or more frames being different from the current frame, and based on the replacing, concealing effects of the erroneous and/or missing current frame on a corresponding reconstructed VDR image.

DESCRIPTION OF EXAMPLE EMBODIMENTS

Overview

Embodiments of the present disclosure relate to image processing and video decoding specific to advanced codecs, such as layer-decomposed codecs, which encode image information in a non-backward compatible format. Such codecs may comprise Dolby's single layer, dual layer and multiple (>2) layer non-backward compatible (NBC) VDR codecs (e.g. Dolby's hierarchical VDR codec), as well as Dolby's dual-layer backward compatible codec.

Throughout the present disclosure, embodiments and variations are described for the purpose of illustrating uses and implementations of the inventive concept. The illustrative description should be understood as presenting examples of the inventive concept, rather than as limiting the scope of the concept as disclosed herein.

As previously mentioned, advanced codecs, such as for example Dolby's NBC codec, have some unique features not available in traditional codecs, which according to various embodiments of the present disclosure can be used in an error control module to conceal errors in any of the three (or more) decoded bitstreams (e.g. frames associated to BL, EL and RPU).

In the exemplary case where the codec comprises three bitstreams (e.g. BL, EL and RPU), for each frame instance, a corresponding BL bitstream (e.g. content frame) can be intact or damaged, a corresponding EL bitstream (e.g. content frame) can be intact or damaged, and a corresponding RPU bitstream (e.g. RPU frame) can be intact or damaged, which provide $2^3=8$ different cases. According to the various embodiments of the present disclosure, frame to frame temporal efforts and relationships are also considered in order to address the error concealment. According to further embodiments of the present disclosure, different error control strategies to resolve the different cases of missing bitstreams are presented such as to provide final reconstructed pictures which are acceptable.

According to an embodiment of the present disclosure and as further explained in later sections of the present disclosure, for an RPU missing case, an algorithm used in the error control module can comprise measuring a mapping function similarity to determine how to estimate a missing curve from temporal nearby correctly received composing parameters associated to nearby correctly received RPU frames. As used in the present disclosure, missing information, such as a missing RPU, a missing BL and a missing EL, can correspond to an associated lost data stream (e.g. packet) and/or an associated received but erroneous data stream.

According to a further embodiment of the present disclosure and as further explained in later sections of the present disclosure, for an EL missing case, an algorithm used in the error control module can comprise finding a clipping area in a corresponding BL and use such area as a mask, searching/pairing the corresponding local clip area in the missing frame and in a correctly received frame, and copying the correct data from the correctly received frame to the missing area for error concealment. The correctly received frame may be a frame occurring after or prior to the missing EL frame. The clipping area in the corresponding BL frame is easily identified by the area comprising pixel values higher than a certain amount as related to the pixel bit depth. For example, for the case where the pixel value is described using 8-bits (e.g. $2^8-1=255$ maximum value), then the clipping area may be the area comprising pixel values greater than the value 250. More information on this can be found in the '926 application.

Although the algorithms above are in relation to only two specific cases, namely (1) RPU missing case, and (2) EL missing case, based on components used in these two algorithms and according to further embodiments of the present disclosure, concealment methods for errors in other cases of missing stream combinations can be provided. Some exemplary cases of such methods and corresponding algorithms are presented in a later section of the present disclosure.

According to an embodiment of the present disclosure, the error control module (120) can reside between a legacy decoder RPU parser (102, 104,1 106) and a composer module (130) as depicted in FIG. 1. The error control module (120) can be an optional add-on to an existing system, and can be inserted between the stream decoders (102, 104, 106) and the hardware/software (HW/SW) composer (130). The error control module (120) of FIG. 1 comprises three main functional blocks (e.g. modules), a joint dual-layer EL concealment functional block (120a), a joint dual-layer RPU concealment functional block (120b) and a joint dual-layer BL concealment functional block (120c), each functional block generating a corrected/concealed stream (e.g. BL, EL or RPU frame) based on the input to the error control module (102, 104, 106, 112, 114, 116). The error control module (120) of FIG. 1 can perform error concealment to conceal any missing/corrupted decoded data in any of the three streams (e.g. EL, BL, RPU) before sending the error-concealed decoded streams to the composer unit (130) for composing. As depicted by FIG. 1, the composer module (130) receives the corrected/concealed BL frame from the EC module (120) via its joint dual-layer BL concealment functional block (120c) and generates, using a predictor functional block (130b), a predicted VDR signal using RPU prediction coefficients from the EC module (120) generated by its joint dual-layer RPU concealment functional block (120b). The composer module (130) also receives the corrected/concealed EL frame from EC module (120) via its joint dual-layer EL concealment module (120a) and generates, using a non-linear dequantizer (NLdQ) functional block (130a), a dequantized residual using the RPU non-linear dequantizer coefficients from EC module (120) generated by its joint dual-layer RPU concealment functional block (120b). Both the RPU prediction parameters and the non-linear dequantizer coefficients being generated by the joint dual-layer RPU concealment functional block (120b) of the EC module (120). Within the composer module (130), the predicted VDR signal generated by the predictor (130b) and the dequantized residual signal generated by the NLdQ functional block get summed to produce a reconstructed (e.g. error concealed) VDR output signal (150) which can be fed to a compatible display for viewing of a corresponding video image. Within the codec configuration (100) depicted in FIG. 1, basic operation of the composer unit (130), as well as the decoder/parser units (e.g. 102, 104, 106) remain the same as in the case where EC module (120) is not used. The skilled person will appreciate the seamless integration of the EC module (120) in the codec configuration (100) depicted by FIG. 1, as its presence is unknown to the other legacy components (e.g. decoder/parser/composer). More information on the NLdQ functional block (130a) and the predictor functional block (130b) used in the composer module (130) can be found in the '932 application. More information on the RPU syntax and data content can be found in the '397 application.

FIG. 1 shows three signal components corresponding to decoded EL, BL and RPU information of a VDR data stream by a legacy decoder (102, 106) and an RPU parser (104), which are fed to the error concealment module (120). Although some legacy decoders may have an embedded error concealment capability for the BL and EL streams, this capability is not a requirement for the various embodiments of the present application. Moreover, associated with each of the three decoded components is a corresponding reliability flag (112, 114, 116) generated by the legacy decoder (102, 106) and the RPU data parser (104).

The reliability flag (112, 116) associated to the legacy decoder (e.g. which decodes the EL and BL streams) indicates whether a current frame (e.g. EL and/or BL frame corresponding to a VDR image) is correctly decoded (e.g. reliable) or decoded through error concealment (e.g. not reliable). The error control module (120) according to the various embodiments of the present disclosure can use information from the reliability flag (112, 116) to determine how to conduct error concealment on the received data stream (e.g. ELBL data streams).

Furthermore and as indicated by the legends in FIG. 1, the decoded components for the EL and BL streams are in the form of reconstructed color components (e.g. YCbCr, RGB, and the like). The reconstructed, without loss of generality, YCbCr is generated in a target time frame and when a frame is lost (e.g. in error), error concealment may be applied by the legacy decoder (102, 106) prior to outputting the frame, or the legacy decoder (102, 106) can output (e.g. repeat) the last correctly received and decoded frame. In any case, at any target presentation time stamp (PTS) or picture order count (POC), the legacy decoder (102, 106) outputs one frame (e.g. for each of EL, BL) and the associated reliability flags.

The RPU stream provided by the RPU data parser (104) contains frame by frame composing parameters used by the codec (e.g. the composer module (130)) to reconstruct the original VDR based on the decoded BL and EL streams. For each frame (e.g. VDR image), the RPU is encoded independently (e.g. as an RPU frame) and with the inclusion of a clear delimiter. Each frame in the RPU stream has a corresponding cyclic redundancy check (CRC) used to detect bit errors and a corresponding POC used as a frame index. A missing RPU frame can be detected by checking consistency of the POC content (e.g. frame index number) from nearby frames. Bit error and thus correctness of a received RPU frame can be detected from the corresponding CRC. It should be noted that normally, since each RPU frame is encoded independently, the RPU has no decoding dependency between frames, such as an error in one frame does not propagate to neighboring frames. The RPU reliability flag (114) as shown in FIG. 1 is provided with each RPU frame. A "reliable" status for this flag (114) indicates that a current RPU information/data structure is correctly received, whereas an "unreliable" status for this flag (114) is indicative of a lost or corrupted RPU.

RPU Missing Case:

In this case, for a frame at index j, the BL and EL fed to the legacy decoder (102, 106) result in undamaged (e.g. error-free) YCbCr pictures being output from the legacy decoder, but the RPU for frame j as output by the RPU data parser (104) is damaged (e.g. contains errors or is missing data as indicated by the reliability flag 114)). Let's denote the prediction parameters of the missing RPU frame associated to frame j as $P_j$ and the NLdQ parameters of the missing RPU frame associated to frame j as $Q_j$. Although $P_j$ and $Q_j$ are lost, according to some embodiments of the present disclosure, their values can be estimated. By performing the RPU error concealment sequentially and frame by frame, from a lower frame index to a higher frame index, for a given frame j, the RPU parameters in frame j−1 are available and have been either decoded free of errors, or have been decoded with errors and errors have been concealed according to the same RPU concealment strategy. As such, for any given frame at index j, RPU parameters in frame j−1 are available. Let's denote the RPU parameters in frame (j−1) as $P_{j-1}$ and $Q_{j-1}$. Moreover, decoded data (e.g. BL, EL, RPU) are read into a memory buffer and thus data and related status (e.g. missing/erroneous or not) of an RPU at a frame index larger than j can be obtained. As such, RPU information from the nearest correctly received future frame at index (j+f), where f≥1, can be obtained. Normally, f=1 since the RPU has no frame decoding dependency and the transmission of BL/EL/RPU are muxed (e.g. multiplexed) on a frame by frame basis and the corresponding data is interleaved, such that even the extreme case of an occurrence of a burst error has an effect similar to a random error and not necessarily affecting two neighboring RPU data frames. Let's denote the parameters corresponding to the nearest correctly received future RPU frame as $P_{j+f}$ and $Q_{j+f}$.

According to an embodiment of the present disclosure, the predictor module (e.g. of FIG. 1) can comprise a single color channel predictor for each of the colors channels (e.g. Y, Cb, Cr). In order to improve the computation speed of a prediction for the missing RPU parameters, for each single color predictor, a lookup table (LUT) can be constructed. The LUT can be constructed by passing through all possible codeword values (e.g. according to the bit depth of a pixel being rendered, for example, 0~255 for an 8-bit codec and 0~1023 for a 10-bit codec) as an input to corresponding prediction/NLdQ parameters in either BL or EL and obtain the output values to be stored within the LUT. By listing the one-to-one input/output pair in, for example, an ascending order, we obtain a LUT. We have a LUT for prediction $LP_j(i)$ and a LUT for NLdQ $LQ_j(i)$ at frame j for input codeword i using parameter $P_j$ and $Q_j$. Expression (1) defines a similarity metric between two LUTs as:

$$sim(j-1, j+f) = \frac{1}{2^{bitdepth}} \sum_{i=0}^{2^{bitdepth}-1} |L_{j-1}(i) - L_{j+f}(i)| \quad (1)$$

where $L_j(i)$ can be $Lp_j(i)$ or $LQ_j(i)$. Assume frame (j−1) belongs to a Scene m, denoted $S_m$, and (j+f) belongs to Scene n, denoted $S_n$, where m≤n.

Figure 2:
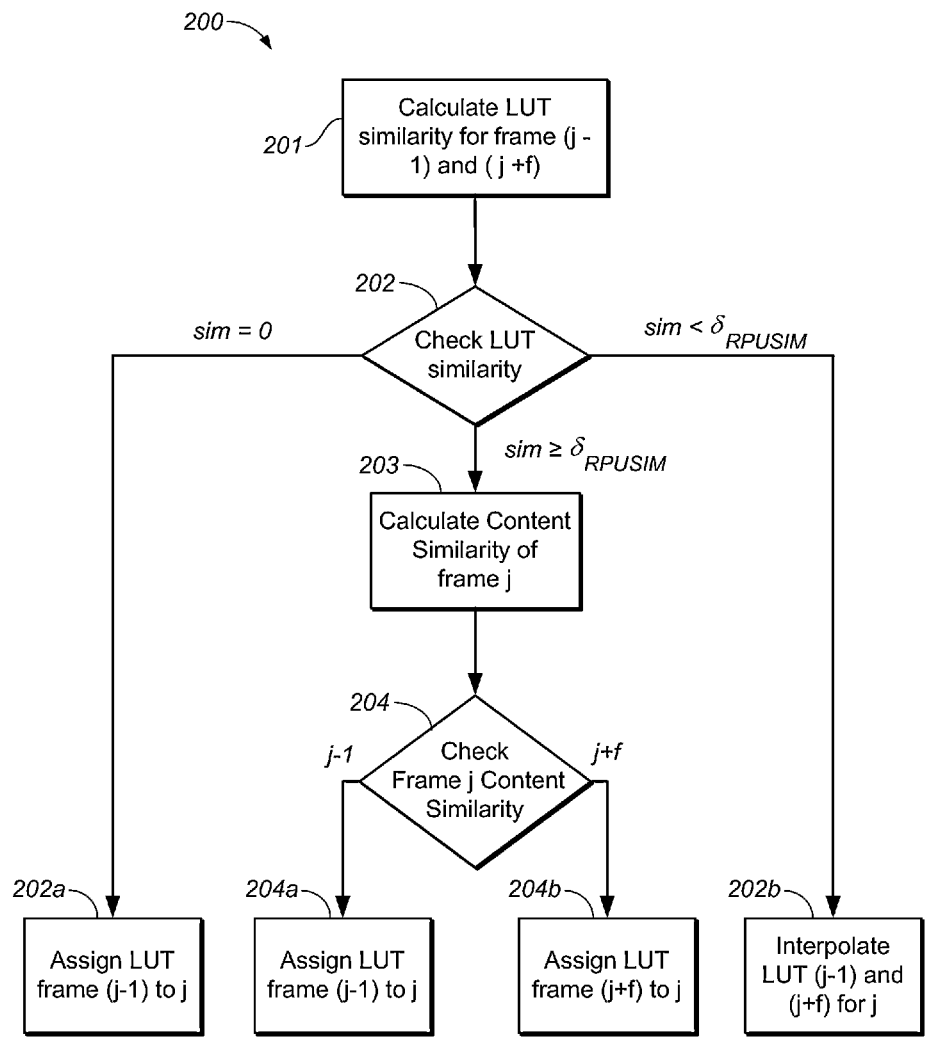
FIG. 2 shows a flowchart of an algorithm according to an embodiment of the present disclosure used to predict missing parameters of a corrupted reference picture unit (RPU) frame.

According to an embodiment of the present disclosure, FIG. 2 shows a flowchart (200) of an algorithm to predict the missing parameters of an RPU frame. The algorithm uses a pre-defined similarity metric (e.g. expression (1)) to measure the similarity of the RPU parameters between the two frames j−1 and j+f, (e.g. step 201 of flowchart 200). As per above discussion, parameters of frame j−1 are obtained via prior frame decoding and can include error concealment, whereas parameters of frame j+f are of a correct frame received after the frame j, as provided within a memory buffer. The result of the similarity measurement is checked in a step (202) of the flowchart (200) and can be one of three: a) the two frames can have a same/identical parameters, denoted in FIG. 2 by sim=0, where sim is given by expression (1), b) the two frames can have different but close parameters (e.g. similar parameters), denoted in FIG. 2 by sim≤$\delta_{RPUSIM}$, and c) the two frames can have parameters which are different, denoted in FIG. 2 by sim>$\delta_{RPUSIM}$.

According to the flowchart presented in FIG. 2, for each of the three cases a), b) and c), the algorithm performs the following:

case *a*): sim(j−1,j+f)=0 (2)

In this case, represented by step (202*a*) of the flowchart (200), the RPU parameters used in frame j−1 and in frame j+f are identical. In this case, there is a great chance that frame j uses the same parameters as used in frames j−1 and j+f. In this case, the algorithm assigns the parameters in frame j−1 to the missing frame j. This can be done by assigning to frame j the LUT of frame j−1.

case *b*): sim(j−1,j+f)≤$\delta_{RPUSIM}$ (3)

In this case, represented by step (202*b*) of the flowchart (200), the RPU parameters used in frame j−1 and in frame j+f are not identical, but their similarity is within a range, as specified by expression (3). In this case the algorithm represented by FIG. 2 (e.g. step 202*b*) uses expression (4) to generate a bi-weighted interpolated LUT of the LUTs of frames j−1 and j+f, and assigns the generated bi-weighted interpolated LUT to frame j.

$$L_j(i) = \frac{f}{f+1}L_{j-1}(i) + \frac{1}{f+1}L_{j+f}(i); \text{ for all values of } i \quad (4)$$

case c): $sim(j-1, j+f) > \delta_{RPUSIM}$ (5)

In this case, the measured similarity is too large, as given by expression (5). This implies the RPU content before frame j and after frame j (e.g. at frame j+f) have a higher difference, such as in the case of, for example, two different scenes, a dissolving scene, a fade-in/fade-out. In this case, according to the flowchart of FIG. 2, a content similarity (instead of LUT similarity) in either BL or EL is calculated (e.g. in step 203) and then checked (e.g. in step 204). In other words, if frame j−1 and frame j have higher content similarity than frame j and frame j+f, according to a preferred embodiment of the present disclosure, LUT from frame j−1 can be used to determine the missing RPU parameters (e.g. use LUT of frame j−1 for missing frame j). This is shown in the flowchart of FIG. 2 by the decision branch denoted j−1 and step (204a) of the flowchart (200). On the other hand, if frame j+f and frame j have higher content similarity than frame j and frame j−1, according to a preferred embodiment of the present disclosure, LUT from frame j+f can be used to determine the missing RPU parameters. This is shown in the flowchart of FIG. 2 by the decision branch denoted j+f and step (204b) of the flowchart (200).

Let's denote by $m_{j,p}^{BL}$ the value of the $p^{th}$ pixel with coordinate $(x_{j,p}, y_{j,p})$ in the decoded BL frame j. The content similarity can be measured according to various metrics. According to one exemplary embodiment of the present disclosure, a metric for measuring content similarity can be the mean luma value of a frame. The mean (luma) value of a (decoded) frame (e.g. picture) with a width of W pixels and a height of H pixels can be provided by expression (6):

$$m_j^{BL} = \frac{1}{WH}\sum_p m_{j,p}^{BL} \quad (6)$$

The mean (luma) value of a frame (e.g. picture) as provided by expression (6) can be used as a metric to define a similarity between two pictures at indices j−1, j and at indices j, j+f, as given by expressions (7) and (8) respectively:

$$\text{LumaSim}(j-1,j)=\text{abs}(m_{j-1}^{BL}-m_j^{BL}) \quad (7)$$

$$\text{LumaSim}(j,j+f)=\text{abs}(m_j^{BL}-m_{j+f}^{BL}) \quad (8)$$

A simple binary decision (e.g. decision branches j−1 and j+f out of step 204 of flowchart 200 in FIG. 2) can be done by comparing the two similarities given by expressions (7) and (8), and assign to the missing RPU frame the LUT corresponding to the frame with the most similar BL content. For example, if expression (7) yields to a smaller value than expression (8), then the LUT corresponding to frame j−1 can be used as a LUT for the missing frame j, and if expression (8) yields to a smaller value than or equal to value to expression (7), then the LUT corresponding to frame j+f can be used as a LUT for the missing frame j.

Other metrics for measuring frame similarities based on luma and/or chroma information of a frame can also be used. Some examples of such metrics are provided:

Similarities based on luma information of clipped pixels:
Let's denote by $M_{j,p}^{BL}$ the value of the $p^{th}$ pixel with coordinate $(x_{j,p}, y_{j,p})$ in the decoded BL frame j. Let's denote the pixel set $M_j^{BL}$ as the collection of pixel index in BL whose values are clipped (either high clipping, as value=$2^{BL\_bitdepth}-1$ or low clipping, as value=0).

High clipping: $M_j^{BL}=\{(j,p)|m_{j,p}^{BL}=(2^{BL\_bitdepth}-1)\}$ (9)

The number of pixel in $M_j^{BL}$ is given by: $|M_j^{BL}|$

Similarly, the number of clipped pixels in frames j−1 and j+f are given by $|M_{j-1}^{BL}|$ and $|M_{j+f}^{BL}|$ respectively.

A luma content similarity measurement can be expressed as:

$\text{LumaSim}(j-1,j)=\text{abs}(|M_{j-1}^{BL}|-|M_j^{BL}|)$ (10)

$\text{LumaSim}(j,j+f)=\text{abs}(|M_j^{BL}|-|M_{j+f}^{BL}|)$ (11)

Accuracy of such measurement can be improved by performing the measurement over two (or more) previous frames and two (or more) future frames such as to remove any temporal noise.

Similarities based on luma information of unclipped pixels:
Yet another method is to use the mean value of pixels which are not clipped as a measurement metric. These are defined by the expression:

$$m_j^{BL} = \frac{1}{WH - |M_j^{BL}|} \sum_{p \in M_j^{BL}} m_{j,p}^{BL} \quad (12)$$

A luma content similarity measurement can be expressed as:

$\text{LumaNonClipMean}(j-1,j)=\text{abs}(m_{j-1}^{BL}-m_j^{BL})$ (13)

$\text{LumaNonClipMean}(j,j+f)=\text{abs}(m_j^{BL}-m_{j+f}^{BL})$ (14)

Similarities based on chroma information of Cb and Cr components:
Let's denote the maximal value of Cb and Cr components in frame j as:
$Cb_j^{max}$ and $Cr_j^{max}$
A metric based on chroma similarity can be defined as:

$CbSim(j-1,j)=\text{abs}(Cb_{j-1}^{max}-Cb_j^{max})$ (15)

$CbSim(j,j+f)=\text{abs}(Cb_j^{max}-Cb_{j+f}^{max})$ (16)

$CbSim(j-1,j)=\text{abs}(Cr_{j-1}^{max}-Cr_j^{max})$ (17)

$CbSim(j,j+f)=\text{abs}(Cr_j^{max}-Cr_{j+f}^{max})$ (18)

EL Missing Case:

According to various embodiments of the present disclosure, two methods for EL error concealment are provided for the case where the EL data is missing (e.g. corrupted). Depending on the available computation resources (e.g. hardware/software processing power) at the decoder side, one or other of the two methods can be better suited for implementation. The first method, which is less computational intensive, uses a global motion vector. The second method, being more complex and thus more computational intensive than the first method, uses local information (e.g. objects within a picture frame). These two methods are described in the following sections.

EL Missing Case: Simple Method Using Global Motion Vector

Figure 3:
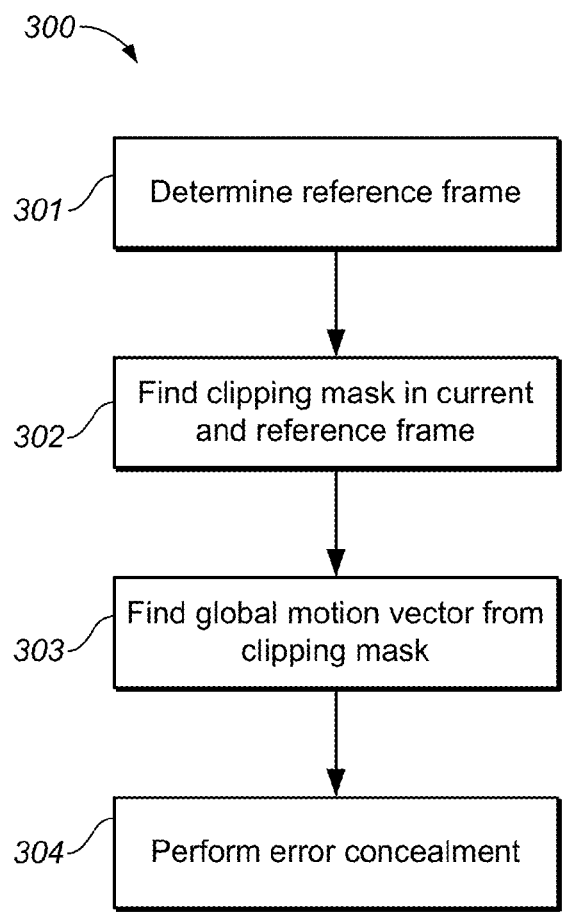
FIG. 3 shows a flowchart of an algorithm according to an embodiment of the present disclosure used to perform error concealment for a missing enhanced layer (EL) frame using a global motion vector.

In this method, whose flowchart (300) is depicted in FIG. 3, a global motion exhibited from the objects in a current (missing) frame and a reference frame is captured. During a first step (301) of the simple algorithm (300), the reference frame can be determined. As used herein, a reference frame can be any corrected/concealed or correctly received frame with a frame index smaller than the frame index of the current frame, or a correctly received frame with a frame index larger than one of the current frame (e.g. as provide by the memory buffer). During a second step (302) of the simple algorithm (300), it can be determined which parts in the current frame needs error concealment, and which parts in the reference frame potentially can be candidates to conceal the errors in the current frame. During a third step (303) of the simple algorithm (300), a global motion vector for those corresponding parts can be determined, and based on the determined motion vector, error concealment can be performed during a fourth step (304) of the algorithm (300). According to an embodiment of the present disclosure, FIG. 3 shows a flowchart of the simple algorithm using a global motion vector, which is described as follows:

STEP 1: Determine Reference Frame from Intra-Scene (e.g. Step 301 of 300)

Let's consider the scenario where frame j is lost. Depending on a display order, frame j can be in a same scene as frame j−1 ($S_m$), or it can be in a same scene at frame j+f ($S_n$). As such, in order to use concealment data from a frame (e.g. reference frame) within a same scene as the missing frame (e.g. at frame index j), the algorithm first establishes which scene the missing frame corresponds to: same scene as frame j−1 or same scene as frame j+f. This correspondence is established by using the RPU similarity metric between two LUTs defined in previous section, which allows to determine which scene ($S_m$ or $S_n$) frame j belongs to. Let's denote the reference frame index as c, which can be derived as per the following detect_reference_index routine:

start detect_reference_index

// Calculate $sim(j-1, j)$ and $sim(j, j+1)$:

$$sim(j-1, j) = \frac{1}{2^{BL\_bitdepth}} \sum_{i=0}^{2^{BL\_bitdepth}-1} |L_{j-1}(i) - L_j(i)|$$

$$sim(j, j+f) = \frac{1}{2^{BL\_bitdepth}} \sum_{i=0}^{2^{BL\_bitdepth}-1} |L_j(i) - L_{j+f}(i)|$$

If($sim(j-1, j) > sim(j, j+f)$) & (frame $j+f$ is available)

frame $j$ is in $S_n$ $c = j + f$ else frame $j$ is in $S_m$ $c = j - 1$ end detect_reference_index The skilled person will readily understand the logical steps performed in the detect_reference_index routine to establish correspondence of the missing frame j with one of frame j−1 and frame j+f.

STEP 2: Find the Clipping Mask in Current Frame and Reference Frame (e.g. Step 302 of 300)

Let's denote the value of the $p^{th}$ pixel with coordinate ($x_{j,p}$, $y_{j,p}$) in the BL frame j as $m_{j,p}^{BL}$. Let's denote the pixel set $M_j^{BL}$ as the collection of pixel index (e.g. $p^{th}$) in BL whose values are clipped (either high clipping, as value=$2^{BL\_bitdepth}-1$ or low clipping, as value=0).

High clipping: $M_j^{BL}=\{(j,p)|m_{j,p}^{BL}=(2^{BL\_bitdepth}-1)\}$ (19)

Low clipping: $M_j^{BL}=\{(j,p)|m_{j,p}^{BL}=0\}$ (20)

As used in the present disclosure, $M_j^{BL}$ can be referred to as the BL clipping mask of the frame j. Similarly, as provided by expressions (21) and (22), we can obtain the BL clipping mask for the reference frame. As defined above, if frame j is inside the same scene as frame j−1, then c=j−1, and if frame j is inside the same scene as frame j+1, then c=j+1.

High clipping: $M_c^{BL}=\{(c,p)|m_{c,p}^{BL}=(2^{BL\_bitdepth}-1)\}$ (21)

Low clipping: $M_c^{BL}=\{(c,p)|m_{c,p}^{BL}=0\}$ (22)

It should be noted that a clipping mode, whether high-clipping or low-clipping, can be detected via a parameter value in the RPU stream, such as, for example, the NLQ_offset parameter for the case of an RPU syntax defined in the '397 application. In this case, when the NLQ_offset value is near 0, the system operates in the high-clipping mode (e.g. as it remains more data in the highlight part and needs more positive residual, so the offset moves toward 0). When the NLQ_offset value is near $2^{EL\_bitdepth}$, the system operates in the low-clipping mode (e.g. as it remains more data in the dark area and needs more negative residual, so the offset moves toward $2^{EL\_bitdepth}$). Detecting the clipping mode can be used to determining how to derive the clipping mask (e.g. using expressions 19, 21 or 20, 22). The current clipping mode the system is operating can be defined by expression (23):

clipping_method=(NLQ_offset>$2^{EL\_bitdepth-1}$)?low clipping:high clipping (23)

The skilled person will readily be familiar with the '?' ':' ternary operator, in which an expression A=(B)?C:D has meaning of if (B==TRUE), A=C;

else A=D.

It should be noted that the concept of clipping as used in the present disclosure is in relation to the various implementations used in a layer-decomposed codec and as explained in further details in, for example, the '932 application and the '926 application.

STEPS 3-4: Error Concealment Via BL Clipping Mask Guide (Global Motion Vector) (e.g. Steps 303-304 of 300)

Figure 4:
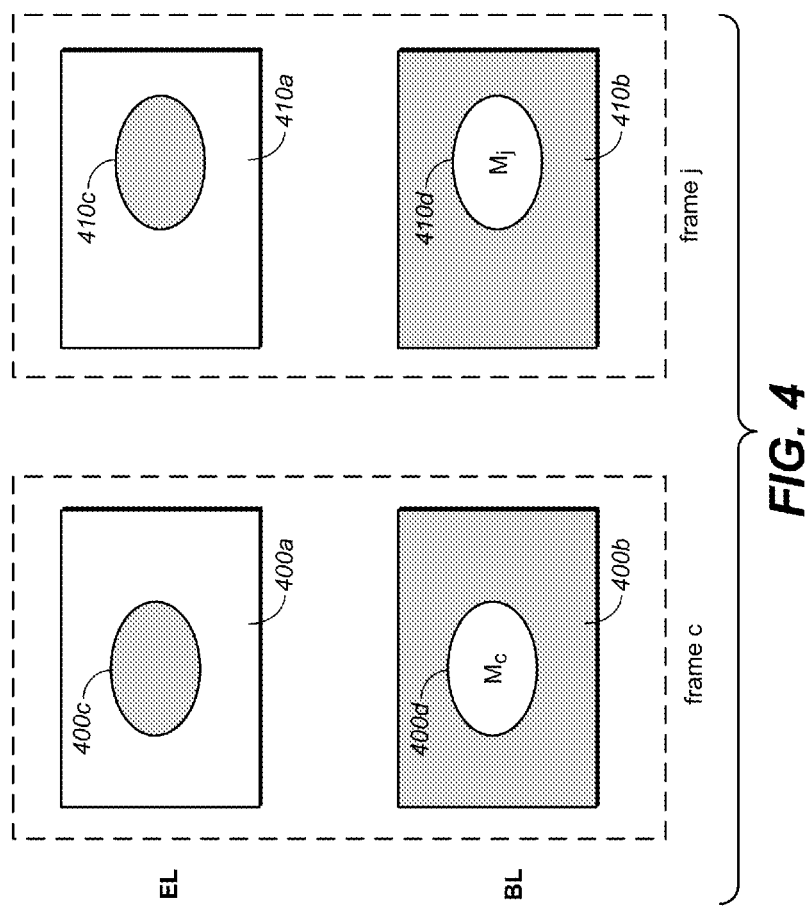
FIG. 4 shows the basic concept, according to an embodiment of the present disclosure, of error concealment via base layer (BL) clipping mask guide.

According to an embodiment of the present disclosure, FIG. 4 depicts the basic concept of error concealment via BL clipping mask guide. As illustrated in FIG. 4, the white areas and gray areas in each of the frames (e.g. at frame index c and j) represent the clipped and the unclipped areas, respectively. As depicted by FIG. 4 and as further explained in the various referenced material, it should be noted that a BL clipped area (e.g. of high clipping values) (400d, 410d), for a given frame (c, j) maps to an unclipped EL area (400c, 410c) of the same frame (c, j), and a BL unclipped area (400b, 410b) for a given frame (c, j) maps to a clipped EL area (400a, 410a) (e.g. of low clipping values) of the same frame (c, j). At frame j, the EL pixel values inside mask $M_j^{BL}$ (410c) only need to be determined, as the EL pixel values outside the mask (410a) are of constant values (e.g. as defined in the RPU syntax). Since the coordinates of the mask $M_c^{BL}$ (400d) and the mask $M_j^{BL}$ (410d) are available, a corresponding movement of the mask $M_c^{BL}$ (400d) from the reference frame (e.g. at frame index c) to frame j at location indicated by $M_j^{BL}$ (410d), in both BL and EL, can be found. This allows to detect the exact EL pixel values inside $M_c^{BL}$ (400c), which given the movement information from $M_c^{BL}$ (400d) to $M_j^{BL}$ (410d), can be copied to EL of frame j inside $M_j^{BL}$ (410c). This yields to copying pixel values in EL of the reference frame c inside mask $M_c^{BL}$ (400c) to pixel values in EL of the missing frame j inside the mask $M_j^{BL}$ (410c).

An exemplary global motion compensation (simple) algorithm is listed below (assuming reference frame is determined):

(a) find center point (centroid) coordinates for mask of frame j, as provided by expression (24):

$$\bar{x}_j = \frac{1}{|M_j^{BL}|} \sum_{p \in M_j^{BL}} x_{j,p} \text{ and } \bar{y}_j = \frac{1}{|M_j^{BL}|} \sum_{p \in M_j^{BL}} y_{j,p} \quad (24)$$

(b) find center point (centroid) coordinates for mask of frame c, as provided by expression (25):

$$\bar{x}_c = \frac{1}{|M_c^{BL}|} \sum_{p \in M_c^{BL}} x_{c,p} \text{ and } \bar{y}_c = \frac{1}{|M_c^{BL}|} \sum_{p \in M_c^{BL}} y_{c,p} \quad (25)$$

(c) find motion vector components corresponding to the two masks, referenced by their centroids, as provided by expression (26):

$$mvx_{cj} = \bar{x}_j - \bar{x}_c \text{ and } mvy_{cj} = \bar{y}_j - \bar{y}_c \quad (26)$$

(d) copy EL pixel in $M_c^{BL}$ to frame j with a motion vector ($mvx_{cj}$, $mvy_{cj}$) when the number of clipped pixels in both frames are similar (e.g. within a margin defined by a value $\Delta$).

$$\text{If}\left(\frac{||M_j^{BL}| - |M_c^{BL}||}{|M_c^{BL}|} < \Delta\right), \text{ then} \quad (27)$$

Figure 5:
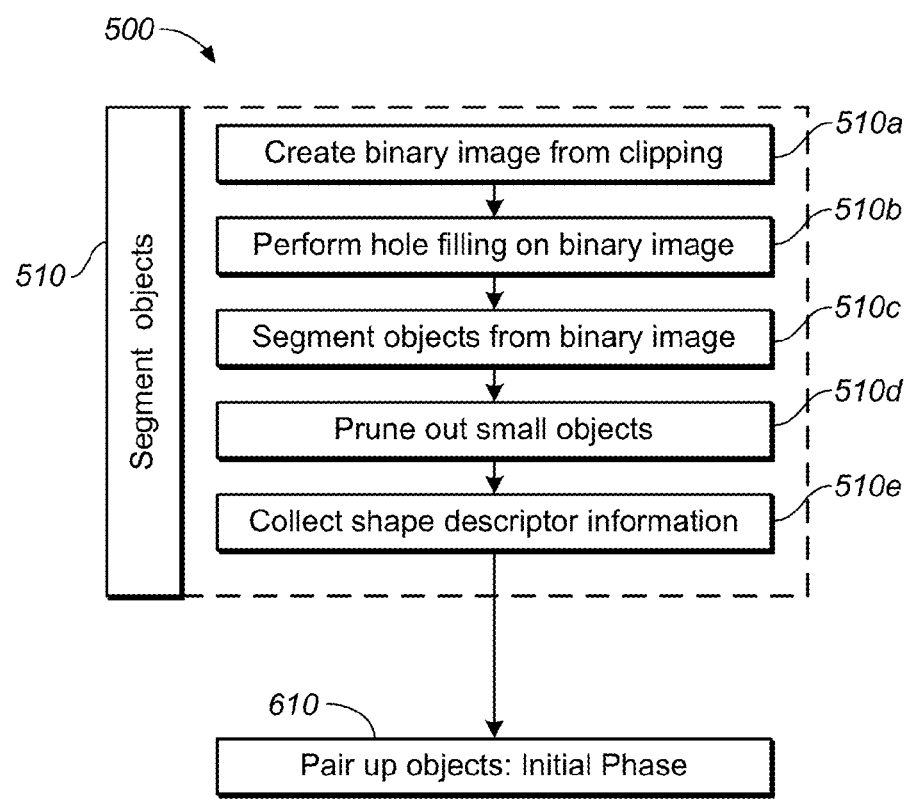
FIGS. 5-7 show a flowchart of an algorithm according to various embodiments of the present disclosure used to perform error concealment for a missing enhanced layer (EL) frame using local object information.
Figure 6:
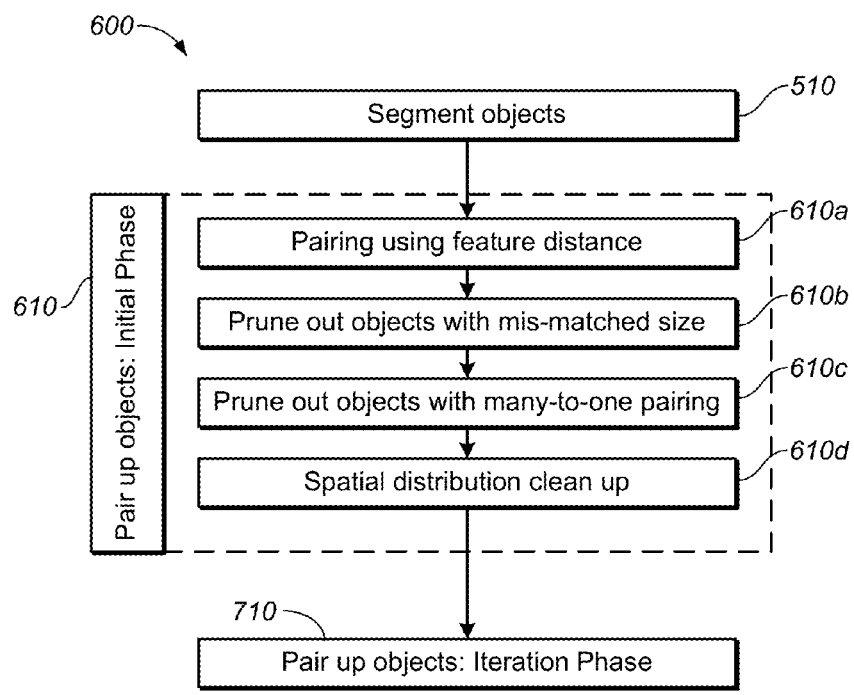
Figure 7:
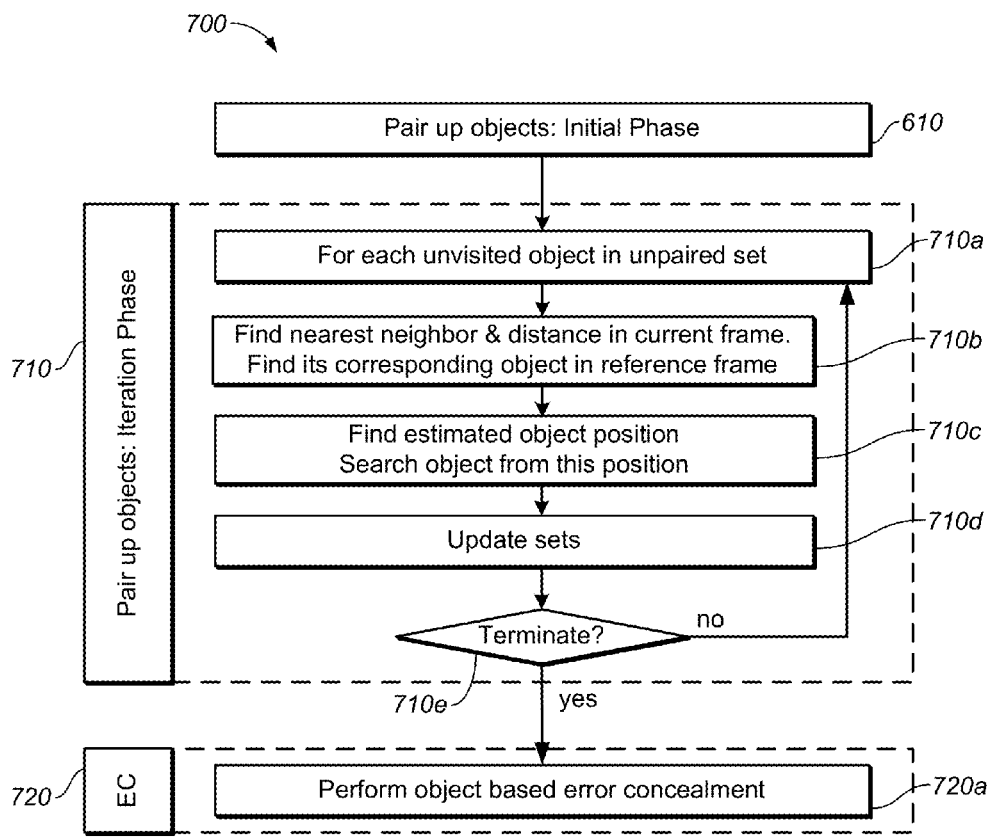

Place pixel value of frame c at (x, y) to pixel located at $(x + mvx_{cj}, y + mvy_{cj})$ at frame j EL Missing Case: Advanced Method Using Local Object Information Though global motion vector, as used in the above (simple) method, is easy to obtain and easy to implement, there are cases where the motion in each object (e.g. within a mask) is not consistent with a global motion vector. In such cases, applying global motion vector on each object which can have a slight different motion direction (e.g. as in the case of the simple method previously described) may generate some noticeable artifacts. To resolve this issue, according to an embodiment of the present disclosure, a motion for each individual object (e.g. within a clipping area) is found and used to apply the error concealment individually to each object. There are 4 basic steps to this method, whose flowchart (500-700) is depicted in FIGS. 5-7. Each step further comprises a number of steps which are described in the ensuing sections. A summary for each step is provided below.

STEP 1: Object Segmentation (Step 510 of Flowchart 500)
(a) Step (510a): Create a binary image based on the clipping area of the picture frame:
Let's denote by $m_{j,p}^{BL}$ the value of the $p^{th}$ pixel (e.g. 8-bits depth) with coordinate $(x_{j,p}, y_{j,p})$ in the decoded BL frame.
Let's create a binary image $B_j$ at location $(x_{j,p}, y_{j,p})$ having pixel value as $b_{j,p}^{BL}$ as provided by expression (28):

$$b_{j,p} = m_{j,p}^{BL} > 250 \quad (28)$$

(b) Step (510b): Perform a hole filling operation on the created binary image:
Noise in the created binary image can result in many holes in the various objects within the image. During this step the holes are filled such as to obtain clean objects. The resultant hole-filled image is denoted $\hat{B}_j$. According to some exemplary embodiments of the present disclosure, filling of the holes in each object can be performed in two steps. During a first step, morphological operators open and close (e.g. http:en.wikipedia.org/wiki/Mathematical_morphology) can be used, and during a second step, flood-filling operation to fill the holes in the image (e.g. imfill.m described at http:www.mathworks.com/help/images/ref/imfill.html) can be used.

(c) Step (510c): Segment objects within the binary image:
During this step various objects within the hole-filled image are identified and labeled, such as, for example, using a 8-connected component. This can be done, for example, by using the operator bwlabel.m as described in http:www.mathworks.com/help/images/ref/bwlabel.html). Let's denote the identified and labeled objects as $\hat{B}_j^{(n)}$.

(d) Step (510d): Prune out small objects:
The applicants have observed that error concealment of small objects can have a reverse effect and result in a more noticeable artifact. This is resolved in the present step by removing all objects smaller or equal (e.g. in area) than a threshold $TH_{area}$, and keep only those objects $\hat{B}_j^{(n)}$ larger than said threshold value, as given by expression (29):

$$\hat{B}_j^{(n)} < TH_{area} \quad (29)$$

Remaining objects after the pruning are relabeled and same notation is kept. Let's $N_B$ denote the number of those objects verifying expression (29).

(e) Step (510e): Collect shape descriptor information:
During this step, related shape information for each of the objects obtained in the prior step is collected. Related shape information can comprise:
Area
Major axis length
Minor axis length
Centroid coordinates $(\bar{x}_j^{(n)}, \bar{y}_j^{(n)})$ given by:

$$\bar{x}_j^{(n)} = \frac{1}{|\hat{B}_j^{(n)}|} \sum_{p \in \hat{B}_j^{(n)}} x_{j,p} \text{ and } \bar{y}_j^{(n)} = \frac{1}{|\hat{B}_j^{(n)}|} \sum_{p \in \hat{B}_j^{(n)}} y_{j,p} \quad (30)$$

Mean of chroma (e.g. Cb and Cr in BL)
Other features

Each of the object is therefore associated multiple information.

Let's denote the $i^{th}$ feature information of the $n^{th}$ object in frame j as $\hat{S}_{j,i}^{(n)}$. There are many features which can be used to describe the shape of an object. The following notations can be used:

Denote the area (total number of pixels in the object) as $\hat{S}_{j,0}^{(n)}$

Denote major axis length as $\hat{S}_{j,1}^{(n)}$

Denote minor axis length as $\hat{S}_{j,2}^{(n)}$

Denote centroid coordinate as $\hat{S}_{j,3}^{(n)}$

Object segmentation, as summarized in the above steps a)-e) (510a-510e), is performed for both the correctly received frame c and the missing (e.g. erroneous) frame j. In the next steps, the objects from the two frames are paired up, such as each object in frame has a unique corresponding object in frame c.

STEP 2: Pair Up Objects (Steps 610, 710 of Flowcharts 600, 700)

During this step an iterative algorithm to pair up objects is used. There are two phases involved in this step, namely, an initial phase as described in STEP 2.1 below, and an iterative phase as described in STEP 2.2 below.

STEP 2.1: Initial Phase (steps 610a-610d of step 610) In the initial phase objects are paired up by first measuring the similarity of all objects in both frames (e.g. c and j). Note that one object may have similar similarity as an irrelevant far away object. In addition, many-to-one mapping could occur owing to similar similarity, for example, multiple objects in frame j can pair up to a same object in frame c. This is undesired since a rigid object in frame c will move to only one new location in frame j. Therefore in this phase, any ambiguous mapping is pruned out such as to only obtain paired up objects with a one-to-one mapping. This phase provides a pair up list with high confidence.

The various steps (610a-610d) of STEP 2.1 are as follow:

Step (610a) Pairing using feature distance

Let's denote $O_j$ as the set of all objects in frame j and $O_c$ as the set of all objects in frame c. Note that objects in sets $O_j$ and $O_c$ are not paired up at this stage, therefore, element 1 in one set is not necessarily paired with element 1 in the other set. Also, the total number of elements in one set may be different from the total number of elements in the other set.

For a current $n^{th}$ object in the current frame j, the feature distance between current object to all objects (m) in frame c is given by:

$$D_{jc}^{(n,m)} = \sum_{i>0} w_i |\hat{S}_{j,i}^{(n)} - \hat{S}_{c,i}^{(m)}| \quad (31)$$

In the current algorithm, the feature set is defined by its major axis length and its minor axis length.

The matched object in frame c is selected from the one having minimal feature distance, such as:

$$\tilde{n} = \underset{m}{\arg\min} D_{jc}^{(n,m)} \quad (32)$$

Step (610b) Prune out the objects with mismatched size

An area constrain is set up, such as to reduce area mismatch during the error concealment stage (a big area in frame c should not match to a small area in frame j, or vice versa). This can be performed by the following expression:

$$\tilde{n} = \left(\frac{\hat{S}_{j,0}^{(n)} - \hat{S}_{c,0}^{(\tilde{n})}}{\hat{S}_{j,0}^{(n)}} < TH_{area\_ratio}\right)?\tilde{n}: NULL \quad (33)$$

Let's denote the paired up set in frame j as $\Omega_j=\{n\}$ and the corresponding set in frame c as $\Omega_c=\{\tilde{n}\}$. Note that co-located elements in sets $\Omega_j$ and $\Omega_c$ are a pair.

Step (610c) Prune out objects with many-to-one pairing

Some elements in the set $\Omega_c=\{\tilde{n}\}$ may contain the same value. It implies the mapping can be many-to-one mapping. It implies an object in frame c can be duplicated to multiple locations in frame j, which is not practical for a rigid object assumption. Let's denote those elements of many-to-one pair in frame c as $\Omega'_c$ and corresponding elements in frame j as $\Omega'_j$. All such elements can be removed from set $\Omega_c$, such as:

$$\Omega_c = \Omega_c \backslash \Omega'_c \quad (34)$$

and the corresponding elements in $\Omega_j$ can be removed, such as:

$$\Omega_j = \Omega_j \backslash \Omega'_j \quad (35)$$

Step (610d) Spatial Distribution Clean up

For each object pair n and $\tilde{n}$, calculate the motion vector:

(i) find center point for frame j:

$$\bar{x}_j^{(n)} = \frac{1}{|\hat{B}_j^{(n)}|} \sum_{p \in \hat{B}_j^{(n)}} x_{j,p} \text{ and } \bar{y}_j^{(n)} = \frac{1}{|\hat{B}_j^{(n)}|} \sum_{p \in \hat{B}_j^{(n)}} y_{j,p} \quad (36)$$

(ii) find center point for frame c:

$$\bar{x}_c^{(\tilde{n})} = \frac{1}{|\hat{B}_c^{(\tilde{n})}|} \sum_{p \in \hat{B}_c^{(\tilde{n})}} x_{c,p} \text{ and } \bar{y}_c^{(\tilde{n})} = \frac{1}{|\hat{B}_c^{(\tilde{n})}|} \sum_{p \in \hat{B}_c^{(\tilde{n})}} y_{c,p} \quad (37)$$

(iii) find motion vector:

$$mvx_{jc}^{(n,\tilde{n})} = \bar{x}_j^{(n)} - \bar{x}_c^{(\tilde{n})} \text{ and } mvy_{jc}^{(n,\tilde{n})} = \bar{y}_j^{(n)} - \bar{y}_c^{(\tilde{n})} \quad (38)$$

$$\text{thus: } mv_{jc}^{(n,\tilde{n})} = \sqrt{\left(mvx_{jc}^{(n,\tilde{n})}\right)^2 + \left(mvy_{jc}^{(n,\tilde{n})}\right)^2} \quad (39)$$

If an object has a very big motion (e.g. larger than a preset value $TH_{motion}$), as measured by a corresponding motion vector, it can be treated as belonging to a mismatched pair and therefore remove from the pair list, as provided by the following expression:

$$\tilde{n} = (mv_{jc}^{(n,\tilde{n})} < TH_{motion})?\tilde{n}:NULL \quad (40)$$

Let's denote those elements with large motion vector pair in frame c as $\Omega''_c$ and corresponding elements in frame j as $\Omega''_j$. All such kind of elements can be removed from set $\Omega_c$, such as:

$$\Omega_c = \Omega_c \backslash \Omega''_c \quad (41)$$

and the corresponding elements can be removed from set $\Omega_j$, such as:

$$\Omega_j = \Omega_j \backslash \Omega''_j \quad (42)$$

At this stage, $\Omega_c$ and $\Omega_j$ contain paired up objects with high confidence. The unpaired object are collected in sets, $\underline{\Omega}_j$ and $\underline{\Omega}_c$, such as:

$$\underline{\Omega}_j = O_j \backslash \Omega_j \quad (43)$$

$$\underline{\Omega}_c = O_c \backslash \Omega_c \quad (44)$$

STEP 2.2: Iterative phase (steps 710a-710e of step 710) In the iterative phase pairing up of the remaining unpaired objects is performed, as all objects from the two frames are not paired up with high confidence. The iterative phase exploits the geometrical information and correlation between objects. As depicted by the two frames of FIG. 8, for each unpaired object (820b) in the current frame j (e.g. n in the current frame of FIG. 8), a neighboring already paired object (820a) in frame j (e.g. ñ in the current frame of FIG. 8) is identified. After identifying the corresponding paired object (810a) of this neighbor in frame c (e.g. $\bar{n}$ in the reference frame of FIG. 8), the unpaired object search can be restricted within a corresponding local range (830) (e.g. defined by radius $TH_{motion}$ in the reference frame of FIG. 8). The search can result in a best pairing candidate (810b) in frame c (e.g. ñ in the reference frame of FIG. 8), which can then be selected to be paired with the unpaired object (820b) in frame j. The pair up list can be updated and the same iterative phase can be repeated until no other objects can be paired.

Figure 8:
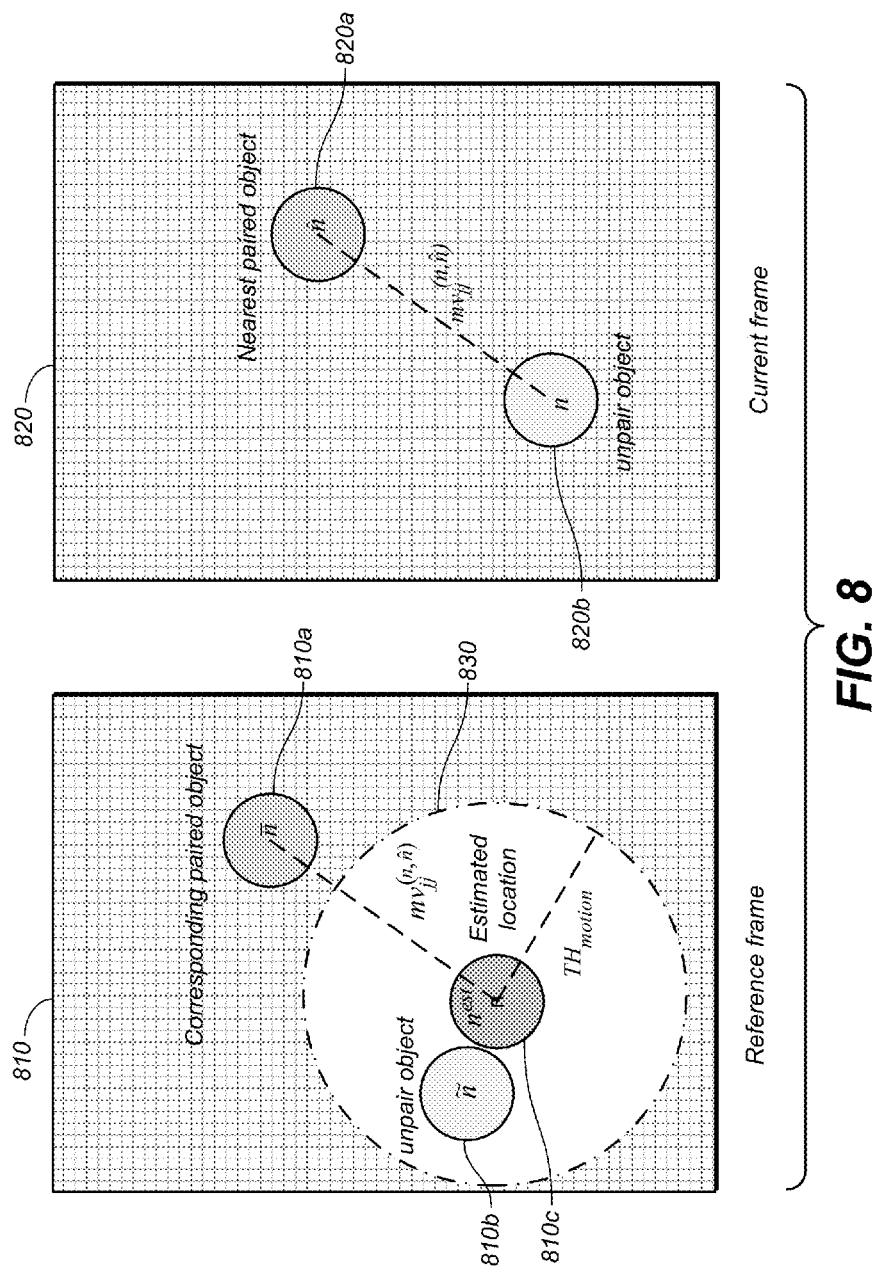
FIG. 8 shows the pairing up process used for pairing up objects in a current and reference frame.

The various steps (710a-610d) of STEP 2.2 are as follow and as referenced by items of FIG. 8:

Step (710a) For each unvisited object (820b) in the unpaired set, perform the following steps:

Step (710b) Find nearest neighbor (820a) and distance in current frame, then find its corresponding object (810a) in the reference frame:

Step (710b.1) For each unpaired object n∈$\underline{\Omega}_j$ (820b) in current frame j, find the nearest object ñ∈$\Omega_j$ (820a), with a distance constraint. Define the distance between two object n and t as:

$$mvx_{jj}^{(n,t)} = \bar{x}_j^{(n)} - \bar{x}_j^{(t)} \text{ and } mvy_{jj}^{(n,t)} = \bar{y}_j^{(n)} - \bar{y}_j^{(t)} \quad (45)$$

thus the distance is:

$$mv_{jj}^{(n,t)} = \sqrt{(mvx_{jj}^{(n,t)})^2 + (mvy_{jj}^{(n,t)})^2} \quad (46)$$

The nearest neighbor is found as:

$$\hat{n} = \underset{t \in \Omega_j}{\arg\min} |mv_{jj}^{(n,t)}| \text{ such that: } mv_{jj}^{(n,t)} < TH_{motion} \quad (47)$$

The distance between object n and its nearest paired neighbor ñ is $mv_{jj}^{(n,\tilde{n})}$ Step (710b.2) Find the object ñ's corresponding paired object, $\bar{n}$, in frame c's set $\Omega_c$.

Step (710c) Find estimated object position, then search object from this position:

Step (710c.1) Estimate the position of object n in frame c ($n^{est}$) (810c) by shifting a distance $mv_{jj}^{(n,\tilde{n})}$ from object $\bar{n}$ (810a):

$$\bar{x}_c^{(est)} = \bar{x}_c^{(\bar{n})} + mvx_{jj}^{(n,\tilde{n})} \quad (48)$$

$$\bar{y}_c^{(est)} = \bar{y}_c^{(\bar{n})} + mvy_{jj}^{(n,\tilde{n})} \quad (49)$$

Step (710c.2) Search object ñ (810b) in frame c closest to the estimated location ($\bar{x}_c^{(est)}$, $\bar{y}_c^{(est)}$) within a certain region $TH_{motion}$:

$$\tilde{n} = \underset{m \in \Omega_c}{\arg\min} |mv_{cc}^{(est,m)}| \text{ such that: } mv_{cc}^{(est,m)} < TH_{motion} \quad (50)$$

Note that the requirement of shape similarity as showed by expression (32) in the initial phase, should also be satisfied:

$$\tilde{n} = \left( \frac{\hat{S}_{j,0}^{(n)} - \hat{S}_{c,0}^{(\tilde{n})}}{\hat{S}_{j,0}^{(n)}} < TH_{area\_ratio} \right)?\tilde{n}: NULL \quad (33)$$

The above procedures for steps (710a-710c) are illustrated in FIG. 8.

Step (710d) Update sets:
if object ñ≠NULL,
(i) include object n into set $\Omega_j$ and object ñ into set $\Omega_c$.
(ii) Update the complementary set $\underline{\Omega}_j = \underline{\Omega}_j \backslash n$ and $\underline{\Omega}_c = \underline{\Omega}_c \backslash \tilde{n}$.

Step (710e) Terminate decision:
(i) If all objects in $\underline{\Omega}_j$ are visited or the set is empty, terminate iteration.
(ii) Otherwise, iteration goes back to step (710b) and starts from the first unvisited (unpaired) object.

The iterative phase as described in step 2.2 guarantees that pairs found are subject to a one-to-one mapping. The update of the matched object spaces in two frames increase the probability that the objects in the unmatched space can find the neighbors in the next run. When space $\underline{\Omega}_j$ remains unchanged after the iterative phase goes through all the objects, then no remaining object can find a pair and the iterative phase stops.

STEP 3: Perform Error Concealment (EC) Based on the Paired Object (Step 720 of Flowchart 700)

For each paired object n in frame j, error concealment is performed by copying EL pixels in object ñ to frame j with a motion vector ($mvx_{cj}^{(n,\tilde{n})}$, $mvy_{cj}^{(n,\tilde{n})}$). In other words, a pixel value located at coordinates (x,y) of frame c is placed to a pixel located at coordinates (x+$mvx_{cj}^{(n,\tilde{n})}$, y+$mvy_{cj}^{(n,\tilde{n})}$) of frame j. It should be noted that in some cases where a shapesize of paired objects is much different, certain image processing, such as for example, scaling and/or image wrapping, can be performed. Such image processing can require higher computational complexity of a target hardware/software implementing this step.

Other Missing Cases:

Teaching according to the two cases presented above, namely the RPU missing case and the EL missing case, can be used to resolve other missing (e.g. corrupted, erroneous) bitstream cases, either singular missing bitstream cases or multiple missing bitstream cases. For example, if the BL bitstream is missing, a similar concealment method as used for the EL missing case can be used by switching the role of the two bitstreams (EL, BL) in the various algorithms presented in the case of the missing EL bitstream. As another example, considering the case where both the RPU and the EL bitstreams are missing. In such case, the presented concealment method for the missing RPU bitstream followed by the presented concealment method for the case of the missing EL bitstream can be used. The skilled person will appreciate how the provided teachings for the two exemplary methods above can be used in concealing missing bitstreams in advanced VDR codecs (e.g. layer-decomposed codecs) prior to reconstructing the VDR pictures. Such advanced VDR codecs can have more than two video bitstreams. Concealment performed in the VDR domain and based on temporal relationship of neighboring reconstructed pictures/images is outside the scope of the present disclosure.

While various embodiments of the present disclosure have been described using the example of error concealment for a VDR codec (e.g. layer-decomposed codec) comprising two video layers (e.g. video content streams) with a single RPU stream, where both the base layer and the enhancement layer video contain video signals pertaining to the VDR video, teachings of the present disclosure are readily applicable to other systems such as, for example, single layer codecs (e.g. non-backward compatible codec), multiple layer (>2) codecs (e.g. non-backward compatible codec) and even dual-layer backward compatible codecs. For example, a single layer non-backward compatible codec using signal reshaping consists of an RPU stream and a BL stream and can therefore be considered a subset of the exemplary dual layer embodiment used throughout the present disclosure. The RPU missing method can therefore be equally used in error concealment of the single layer NBC codec using, for example, information from the BL frames (e.g. content similarity as per step 203 of flowchart 200 of FIG. 2) when needed to determine replacement data for a missing RPU frame. As used herein, the term "signal reshaping" denotes applying a linear or non-linear function to the input signal before being encoded. Examples of signal reshaping functions include traditional gamma functions or the perceptual quantizer function described in PCT Application PCT/US2012/068212, filed on Dec. 6, 2012, and incorporated herein by reference in its entirety.

As another example, a multiple layer (>2) codec using signal reshaping and layer decomposition (thus non-backward compatible) comprises common layers to the exemplary dual layer embodiment used throughout the present disclosure. Therefore the RPU missing method and the EL (or other layer) missing method as per the teachings of the present disclosure can equally be applied in the case of the multiple layer (>2) codec for error concealment. Similarly, some of the teachings according to the present disclosure can be applied for error concealment in the case of backward compatible codecs, such as dual layer backward compatible codecs.

The methods and systems described in the present disclosure may be implemented in hardware, software, firmware or combination thereof. Features described as blocks (e.g. 120a, 120b, 120c), modules (120, 130) or components may be implemented together or separately using a combination of hardware, software and firmware. The software portion of the methods of the present disclosure may comprise a computer-readable medium which comprises instructions (e.g. executable program) that, when executed, perform, at least in part, the described methods. The computer-readable medium may comprise, for example, a random access memory (RAM) and/or a read-only memory (ROM). The instructions may be executed by a processor (e.g., a digital signal processor (DSP), an application specific integrated circuit (ASIC), or a field programmable logic array (FPGA).

Figure 9:
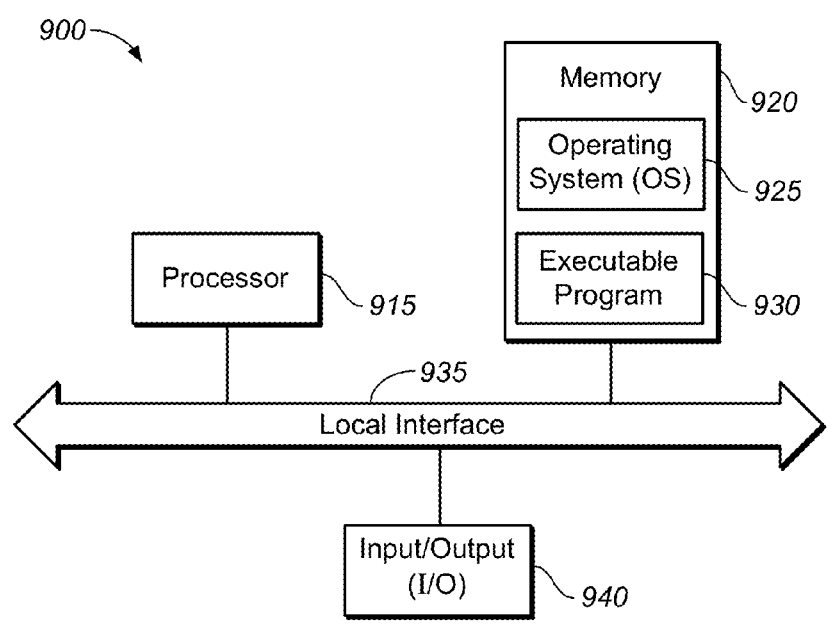
FIG. 9 shows an exemplary embodiment of a target hardware for implementation of methods and systems according to various embodiments of the present disclosure.

FIG. 9 is an exemplary embodiment of a target hardware (900) (e.g. a computer system) for implementing one or more missing bitstream concealment methods according to the various teachings of the present disclosure. This target hardware comprises a processor (915), a memory bank (920), a local interface bus (935) and one or more Input/Output devices (940). The processor may execute one or more instructions related to the implementation of the various provided error concealment methods and as provided by the Operating System (925) based on some executable program stored in the memory (920). These instructions are carried to the processors (920) via the local interface (935) and as dictated by some data interface protocol specific to the local interface and the processor (915). It should be noted that the local interface (935) is a symbolic representation of several elements such as controllers, buffers (caches), drivers, repeaters and receivers that are generally directed at providing address, control, and/or data connections between multiple elements of a processor based system. In some embodiments the processor (915) may be fitted with some local memory (cache) where it can store some of the instructions to be performed for some added execution speed. Execution of the instructions by the processor may require usage of some input/output device (940), such as inputting bitstream data and related reliability flags from a legacy decoder and RPU data parser, inputting commands from a keyboard, outputting data to a display, or outputting concealed bitstream data to a VDR reconstructing module or outputting reconstructed VDR image to a display. In some embodiments, the operating system (925) facilitates these tasks by being the central element to gathering the various data and instructions required for the execution of the program and provide these to the microprocessor. In some embodiments the operating system may not exist, and all the tasks are under direct control of the processor (915), although the basic architecture of the target hardware device (910) will remain the same as depicted in FIG. 9. In some embodiments a plurality of processors may be used in a parallel configuration for added execution speed. In such a case, the executable program may be specifically tailored to a parallel execution. Also, in some embodiments the processor (915) may execute part of a method as provided in the present disclosure, and some other part may be implemented using dedicated hardware/firmware placed at an Input/Output location accessible by the target hardware (910) via local interface (935). The target hardware (910) may include a plurality of executable program (930), wherein each may run independently or in combination with one another. These executable programs can comprise instructions, that when executed by the processor, perform at least part of a method (e.g. algorithm) presented in the present disclosure.

Such exemplary computer hardware as depicted by FIG. 9 can be implemented in an integrated chip (IC). According to some embodiments of the present disclosure, the error control module as presented in the various embodiments of the present disclosure can be implemented partially or in its entirety within an IC. Such IC can be used as an upgrade to fit an existing VDR decoder with the benefits provided by the error control module of the present disclosure. A program stored in a memory (e.g. programmable memory) of the IC can be upgraded such as to fit specific bitstreams associated with a given VDR decoder. According to yet another embodiment of the present disclosure, the entire system presented in FIG. 1 can be implemented within an IC which can be used as a VDR decoder on chip. The skilled person can think of various other possible hardware implementations of the system presented in FIG. 1, whether partially or entirely, and using the provided features of the error control module of FIG. 1 and the various presented related methods.

The examples set forth above are provided to give those of ordinary skill in the art a complete disclosure and description of how to make and use the embodiments of the error control in multi-stream EDR video codec, and are not intended to limit the scope of what the inventors regard as their disclosure. Modifications of the above-described modes for carrying out the disclosure may be used by persons of skill in the video art, and are intended to be within the scope of the following claims. All patents and publications mentioned in the specification may be indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

A number of embodiments of the disclosure have been described. Nevertheless, it will be understood that various modifications may be made without departing from the spirit and scope of the present disclosure. Accordingly, other embodiments are within the scope of the following claims.

What is claimed is:

1. A method for concealing effects of errors in a decoded visual dynamic range (VDR) combination stream, the method comprising:
   receiving a decoded VDR combination stream, the decoded VDR combination stream comprising a reference picture unit (RPU) stream in correspondence of a plurality of RPU frames and one or more video content streams in correspondence of a plurality of content frames;
   receiving a reliability flag in correspondence of an erroneous and/or missing current frame of a stream of the decoded VDR combination stream, the erroneous and/or missing current frame being an RPU frame, or a content frame;
   based on the receiving of the reliability flag, replacing data of the erroneous and/or missing current frame with replacement data based on data in one or more frames of the same stream, the one or more frames being different from the current frame, wherein the replacing data comprises:
   determining, via the reliability flag, an erroneous and/or missing current RPU frame;
   calculating a lookup table similarity for a nearby previous correct RPU frame and a nearby next correct RPU frame;
   based on the calculating, assigning a replacement lookup table (LUT) to the current RPU frame, and
   based on the assigning, replacing data of the erroneous and/or missing current RPU frame,
   wherein a LUT is obtained by passing through all possible codeword values, according to a bit-depth of the corresponding reconstructed VDR image, as input to composing parameters of an RPU frame and obtaining a corresponding output,
   and wherein the replacement LUT is one of: a) a LUT of the nearby previous correct RPU frame, b) a LUT of the nearby next correct RPU frame, and c) a bi-weighted interpolated version of a) and b); and
   based on the replacing, concealing effects of the erroneous and/or missing current frame on a corresponding reconstructed VDR image.

2. The method of claim 1, wherein the assigning further comprises the following steps:
   if a value associated to the calculating is zero, then assigning the replacement LUT of a);
   if a value associated to the calculating is smaller than a threshold value, then assigning the replacement LUT of c);
   if a value associated to the calculating is larger or equal than the threshold value, then based on calculating a content similarity of a current content frame with a nearby previous correct content frame and a nearby next correct content frame, assigning the LUT of a) or b).

3. The method of claim 2, wherein the current content frame is a content frame associated to the erroneous and/or missing current RPU frame, and the nearby previous/next correct content frame is a content frame associated to the nearby previous/next correct RPU frame.

4. The method of claim 2, wherein a metric used for calculating the content similarity is based on a luma value and/or chroma value of a content frame.

5. The method of claim 1, wherein the one or more video content streams of the decoded VDR combination stream comprises a base layer (BL) stream in correspondence of a plurality of BL content frames and one or more enhancement layer (EL) streams in correspondence of a plurality of EL content frames.

6. The method of claim 5, wherein the replacing data further comprises:
   determining, via the reliability flag, an erroneous and/or missing current EL content frame;
   determining a nearby reference EL content frame of the current EL content frame, the nearby reference EL content frame and the current EL content frame belonging to a same scene;
   finding a current clipping area of a current BL content frame associated to the current EL content frame;
   finding a reference clipping area of a reference BL content frame associated to the nearby reference EL content frame;
   based on the finding and the finding, calculating a motion vector between the current clipping area and the reference clipping area, and
   replacing data of the erroneous and/or missing current EL content frame with data of the reference EL content frame associated to the reference clipping area of the reference BL content frame, based on a mapping provided by the motion vector.

7. An error control component configured to receive a decoded visual dynamic range (VDR) combination stream comprising one or more video content streams and a reference picture unit (RPU) stream, wherein during operation, the error control component replaces erroneous and/or missing data in a current frame of the decoded VDR combination stream with replacement data based on data in one or more frames different from the current frame of the decoded VDR combination stream to conceal effect of the erroneous and/or missing data in a reconstructed VDR image in correspondence of the decoded VDR combination stream, wherein the RPU stream comprises a plurality of independent RPU frames comprising composing parameters to reconstruct original VDR images based on a plurality of content frames of the one or more video content streams, wherein the error control component further comprises a joint dual-layer RPU concealment component configured to replace erroneous and/or missing composing parameters in a current RPU frame of the plurality of independent RPU frames in correspondence of a reconstructed VDR image, wherein the joint dual-layer RPU concealment component is configured to estimate, during operation, the erroneous and/or missing composing parameters in the current RPU frame based on a similarity metric of correct composing parameters of a nearby previous RPU frame and a nearby next RPU frame, wherein the similarity metric is applied to lookup tables in correspondence of the correct composing parameters of the nearby previous RPU frame and the nearby next RPU frame.

8. The error control component of claim 7, wherein the correct composing parameters comprises one of: a) composing parameters of a correctly decoded RPU frame, and b) composing parameters of a concealed RPU frame.

9. The error control component of claim 7, wherein the joint-dual layer RPU concealment component is further configured to estimate, during operation, the erroneous and/or missing composing parameters in the current RPU frame based on a content similarity metric of a current content frame and nearby previous/next content frames in correspondence of the nearby previous/next RPU frames.

10. The error control component of claim 9, wherein the content similarity metric is based on a luma and/or a chroma value of a content frame.

11. The error control component of claim 9, wherein the content similarity metric is based on one of: a) a mean luma value of a content frame, b) a luma of clipped pixels of a content frame, c) mean value of unclipped pixels of a content frame, d) maximal chroma value of a content frame, and e) an averaged value over two content frames of any one of a)-d).

12. The error control component of claim 9, wherein the erroneous and/or missing composing parameters are replaced with one of: a) the correct composing parameters of the nearby previous RPU frame, b) the correct composing parameters of the nearby next RPU frame, and c) a bi-weighted interpolated version of a) and b).

13. The error control component of claim 1, wherein the one or more video content streams of the decoded VDR combination stream comprises a base layer (BL) stream and one or more enhancement layer (EL) streams.

14. The error control component of claim 13, wherein the error control component further comprises a joint dual-layer enhancement layer (EL) concealment component configured to replace erroneous and/or missing EL data in a current content frame of a first EL stream of the one or more EL streams.

15. The error control component of claim 14, wherein the joint dual-layer EL concealment component estimates the erroneous and/or missing EL data of the current content frame based on a motion vector between an object in a BL layer of the current content frame and a corresponding object in a BL layer of a reference content frame, the reference content frame being in correspondence of a reconstructed VDR image.

16. A non-transitory computer-readable storage medium having stored thereon computer-executable instructions for executing a method with a processor in accordance with the method of claim 1.

* * * * *